(12) United States Patent
Bachrach et al.

(10) Patent No.: US 12,266,131 B2
(45) Date of Patent: Apr. 1, 2025

(54) AUTONOMOUS AERIAL NAVIGATION IN LOW-LIGHT AND NO-LIGHT CONDITIONS

(71) Applicant: Skydio, Inc., Redwood City, CA (US)

(72) Inventors: Abraham Galton Bachrach, Redwood City, CA (US); Adam Parker Bry, Redwood City, CA (US); Gareth Benoit Cross, Mountain View, CA (US); Peter Benjamin Henry, San Francisco, CA (US); Kristen Marie Holtz, Menlo Park, CA (US); Ryan David Kennedy, Redwood City, CA (US); Hayk Martirosyan, San Francisco, CA (US); Vladimir Nekrasov, Adelaide (AU); Samuel Shenghung Wang, Mountain View, CA (US)

(73) Assignee: Skydio, Inc., San Mateo, CA (US)

( * ) Notice: Subject to any disclaimer, the term of this patent is extended or adjusted under 35 U.S.C. 154(b) by 289 days.

(21) Appl. No.: 17/505,257

(22) Filed: Oct. 19, 2021

(65) Prior Publication Data

US 2022/0315220 A1    Oct. 6, 2022

Related U.S. Application Data

(60) Provisional application No. 63/168,854, filed on Mar. 31, 2021.

(51) Int. Cl.
| | | |
|---|---|---|
| G06T 7/70 | (2017.01) | |
| B64U 10/13 | (2023.01) | |
| B64U 50/37 | (2023.01) | |
| B64U 70/90 | (2023.01) | |
| B64U 70/97 | (2023.01) | |

(Continued)

(52) U.S. Cl.
CPC ............. *G06T 7/70* (2017.01); *B64U 70/90* (2023.01); *B64U 70/97* (2023.01); *B64U 70/99* (2023.01); *G01J 1/4204* (2013.01); *G06T 7/50* (2017.01); *G06V 20/17* (2022.01); *H04N 23/56* (2023.01); *B64U 10/13* (2023.01); *B64U 50/37* (2023.01); *B64U 80/25* (2023.01); *B64U 2101/30* (2023.01); *B64U 2201/10* (2023.01);

(Continued)

(58) Field of Classification Search
None
See application file for complete search history.

(56) References Cited

U.S. PATENT DOCUMENTS 10,538,326 B1 * 1/2020 Cui ..................... G03B 15/006
2015/0035974 A1    2/2015 Lavi et al.

(Continued)

OTHER PUBLICATIONS

International Search Report and Written Opinion mailed on Jul. 19, 2022 in corresponding PCT Application No. PCT/US22/21458.

(Continued)

*Primary Examiner* — Todd Melton
*Assistant Examiner* — Jason R Roberson
(74) *Attorney, Agent, or Firm* — Young Basile Hanlon & MacFarlane, P.C.

(57) ABSTRACT

Autonomous aerial navigation in low-light and no-light conditions includes using night mode obstacle avoidance intelligence and mechanisms for vision-based unmanned aerial vehicle (UAV) navigation to enable autonomous flight operations of a UAV in low-light and no-light environments using infrared data.

20 Claims, 12 Drawing Sheets

(51) Int. Cl.
| | |
|---|---|
| *B64U 70/99* | (2023.01) |
| *B64U 80/25* | (2023.01) |
| *B64U 101/30* | (2023.01) |
| *G01J 1/42* | (2006.01) |
| *G05D 1/00* | (2024.01) |
| *G06T 7/50* | (2017.01) |
| *G06V 20/17* | (2022.01) |
| *H04N 23/56* | (2023.01) |

(52) U.S. Cl.
CPC ....... *B64U 2201/20* (2023.01); *G05D 1/0038* (2013.01); *G06T 2207/10032* (2013.01)

(56) References Cited

U.S. PATENT DOCUMENTS

| | | |
|---|---|---|
| 2019/0340738 A1 | 11/2019 | Hartbauer |
| 2020/0007825 A1 | 1/2020 | Jeong et al. |
| 2020/0209893 A1* | 7/2020 | Lee ........................ H04N 23/11 |
| 2020/0219010 A1 | 7/2020 | Jobling et al. |
| 2020/0284883 A1* | 9/2020 | Ferreira .................. G01S 17/10 |
| 2021/0334580 A1 | 10/2021 | Crescitelli et al. |

OTHER PUBLICATIONS

Wang et al.,"Enhancing low light videos by exploring high sensitivity camera noise", In Proceedings of the IEEE/CVF International Conference on Computer Vision, 2019. (4111-4119 pages).
Extended European Search Report mailed on Dec. 23, 2024 in corresponding European Patent Application No. 22781902.6.

\* cited by examiner

AUTONOMOUS AERIAL NAVIGATION IN LOW-LIGHT AND NO-LIGHT CONDITIONS

CROSS-REFERENCE TO RELATED APPLICATION(S)

This disclosure claims the benefit of U.S. Provisional Application Ser. No. 63/168,854, filed on Mar. 31, 2021, the disclosure of which is herein incorporated by reference in its entirety.

TECHNICAL FIELD

This disclosure relates to autonomous aerial navigation in low-light and no-light conditions.

BACKGROUND

Unmanned aerial vehicles (UAVs) are often used to capture images from vantage points that would otherwise be difficult for humans to reach. Typically, a UAV is operated by a human using a controller to remotely control the movements and image capture functions of the UAV. In some cases, a UAV may have automated flight and autonomous control features. For example, automated flight features may rely upon various sensor input to guide the movements of the UAV.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
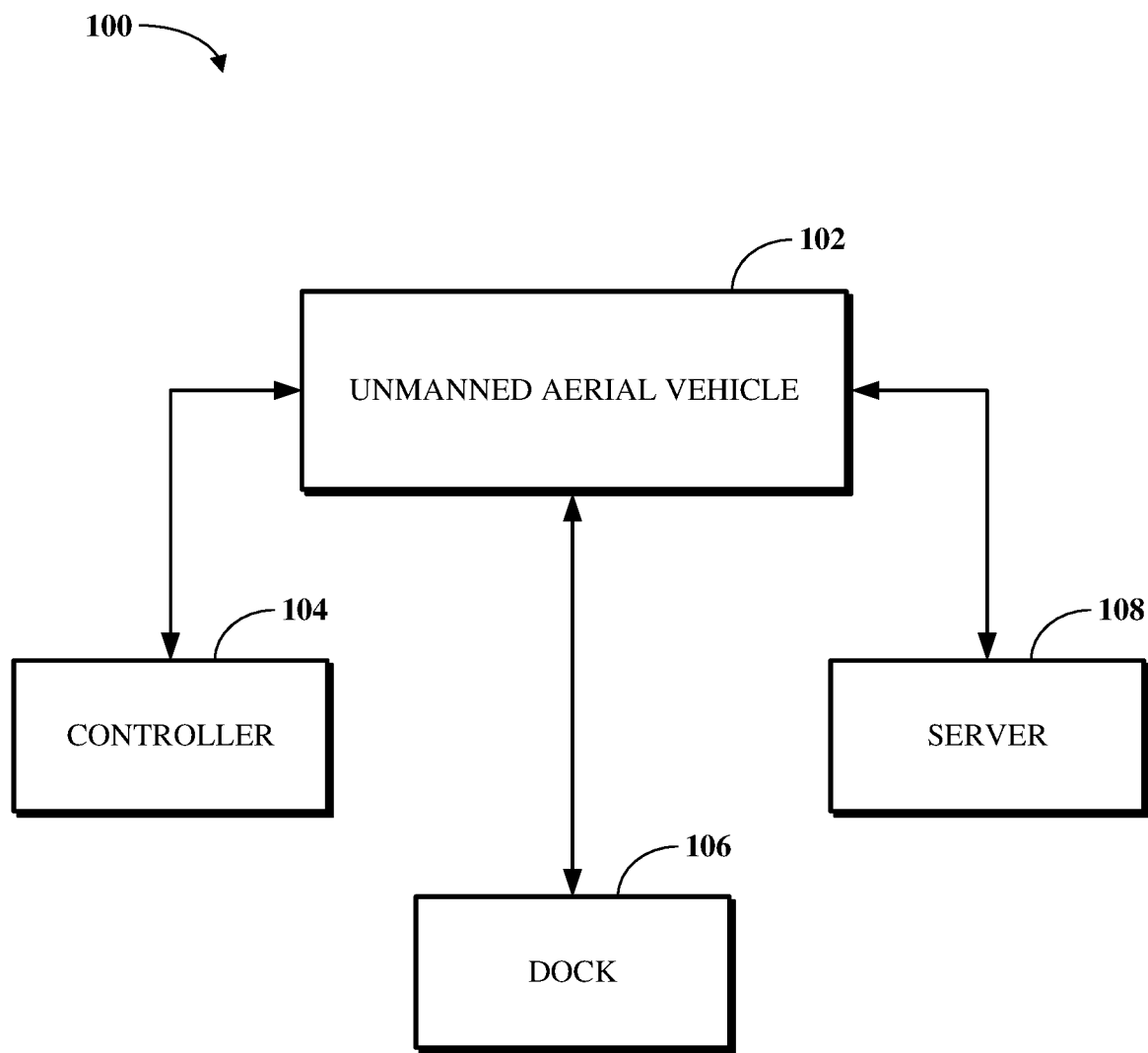
FIG. 1 is an illustration of an example of a UAV system.

Autonomous navigation functions of a UAV conventionally rely upon various onboard sensors, which generate data based on the UAV and/or the environment in which the UAV is operating. The data is generally processed at the UAV to determine one or more aspects of functionality for the UAV, including, for example, how and where the UAV will be flown, whether to capture images and what to focus those images on, whether to follow a subject or a defined flight path, or the like. This processing typically accounts for various environmental and UAV constraints, such as locations of obstacles (e.g., objects) within the environment in which the UAV is operating, indications of whether those obstacles are stationary or mobile, speed capabilities of the UAV, and other external factors which operate against the UAV in-flight.

One common source of sensor data used for UAV navigation are cameras onboard the UAV. For example, one or more cameras coupled to the UAV may continuously or otherwise periodically collect data used to generate images that, when processed by a vision-based navigation system of the UAV, instruct the autonomous navigation functions of the UAV. Conventionally, onboard cameras used for vision-based navigation have infrared filters to prevent infrared data from being collected or to otherwise limit the amount of infrared data that is collected. That is, infrared data may negatively affect the quality of images and therefore may interfere with image processing for autonomous navigation functionality. Accordingly, the filtering of infrared data from images may enhance such functionality and also result in higher quality images output to a connected device display for consumption by an operator of the UAV.

However, such conventional vision-based navigation approaches which rely upon infrared filtering are not optimized for all flight situations and may thus in some cases inhibit autonomous navigation functionality of a UAV. One example of such a situation is where a UAV is being flown in an environment with low or no light, such as outside at nighttime or inside a room that is not illuminated. In such a situation, the UAV must rely upon illumination either from lights onboard the UAV or lights external to the UAV. In some cases, an inability to accurately perceive the environment in which the UAV is located may force the operator of the UAV to disable obstacle avoidance for autonomous vision-based navigation and manually navigate the UAV. In other cases, it may result in a complete inability of the UAV to autonomously navigate the environment (e.g., flight, takeoff, and/or landing) or damage to the UAV, damage to other property in the environment, and/or injury to anyone nearby the UAV.

Implementations of this disclosure address problems such as these using autonomous aerial navigation in low-light and no-light conditions. A UAV as disclosed herein is configured for vision-based navigation while in day mode or night mode and includes one or more onboard cameras which collect image data including infrared data. When the UAV is determined to be in night mode, the UAV performs obstacle avoidance for autonomous vision-based navigation using the infrared data. When the UAV is determined to be in day mode, images produced based on image data including infrared data are used for autonomous vision-based navigation. In some cases, the images used for navigation while the UAV is in day mode may be filtered to remove infrared data therefrom, for example, using a software process or a physical mechanism. In some implementations, the UAV includes one or more blocking mechanisms for preventing or limiting glare otherwise resulting from the exposure of an onboard camera to light (e.g., infrared light) illuminated by a light source onboard the UAV.

As used herein, night mode refers to an arrangement of configurations, settings, functions, and/or other aspects of a UAV based on low-light or no-light conditions of an environment in which the UAV is operating. Similarly, and also as used herein, day mode refers to an arrangement of configurations, settings, functions, and/or other aspects of a UAV based on light conditions of an environment in which the UAV is operating sufficient for typical vision-based navigation functionality. Whether a UAV is in night mode or day mode, and when to switch therebetween, is thus based on an amount of light within the environment of the UAV. For example, a UAV may be in night mode when there is insufficient light for navigation using the onboard cameras, and the UAV may otherwise be in day mode. However, in view of potential differences in operating capabilities of UAVs, manufacturing qualities of UAV components, and variations in amounts of light which may be present both in different locations and at different times, the quality of a condition being a low-light condition or a no-light condition may refer to conditions specific to a subject UAV rather than generic conditions that could potentially otherwise apply to multiple types or classes of UAV.

To describe some implementations in greater detail, reference is first made to examples of hardware and software structures used to implement autonomous aerial navigation in low-light and no-light conditions. FIG. 1 is an illustration of an example of a UAV system 100. The system 100 includes a UAV 102, a controller 104, a dock 106, and a server 108.

The UAV 102 is a vehicle which may be controlled autonomously by one or more onboard processing aspects or remotely controlled by an operator, for example, using the controller 104. The UAV 102 may be implemented as one of a number of types of unmanned vehicle configured for aerial operation. For example, the UAV 102 may be a vehicle commonly referred to as a drone, but may otherwise be an aircraft configured for flight within a human operator present therein. In particular, the UAV 102 may be a multi-rotor vehicle. For example, the UAV 102 may be lifted and propelled by four fixed-pitch rotors in which positional adjustments in-flight may be achieved by varying the angular velocity of each of those rotors.

The controller 104 is a device configured to control at least some operations associated with the UAV 102. The controller 104 may communicate with the UAV 102 via a wireless communications link (e.g., via a Wi-Fi network, a Bluetooth link, a ZigBee link, or another network or link) to receive video or images and/or to issue commands (e.g., take off, land, follow, manual controls, and/or commands related to conducting an autonomous or semi-autonomous navigation of the UAV 102). The controller 104 may be or include a specialized device. Alternatively, the controller 104 may be or includes a mobile device, for example, a smartphone, tablet, laptop, or other device capable of running software configured to communicate with and at least partially control the UAV 102.

The dock 106 is a structure which may be used for takeoff and/or landing operations of the UAV 102. In particular, the dock 106 may include one or more fiducials usable by the UAV 102 for autonomous takeoff and landing operations. For example, the fiducials may generally include markings which may be detected using one or more sensors of the UAV 102 to guide the UAV 102 from or to a specific position on or in the dock 106. In some implementations, the dock 106 may further include components for controlling and/or otherwise providing the UAV 102 with flight patterns or flight pattern information and/or components for charging a battery of the UAV 102 while the UAV 102 is on or in the dock 106.

The server 108 is a remote computing device from which information usable for operation of the UAV 102 may be received and/or to which information obtained at the UAV 102 may be transmitted. For example, signals including information usable for updating aspects of the UAV 102 may be received from the server 108. The server 108 may communicate with the UAV 102 over a network, for example, the Internet, a local area network, a wide area network, or another public or private network. Although not illustrated for simplicity, the server 108 may, alternatively or additionally, communicate with the dock 106 over the same or a different network, for example, the Internet, a local area network, a wide area network, or another public or private network. For example, the communication may include flight patterns or other flight pattern information.

In some implementations, the system 100 may include one or more additional components not shown in FIG. 1. In some implementations, one or more components shown in FIG. 1 may be omitted from the system 100, for example, the server 108.

Figure 2A:
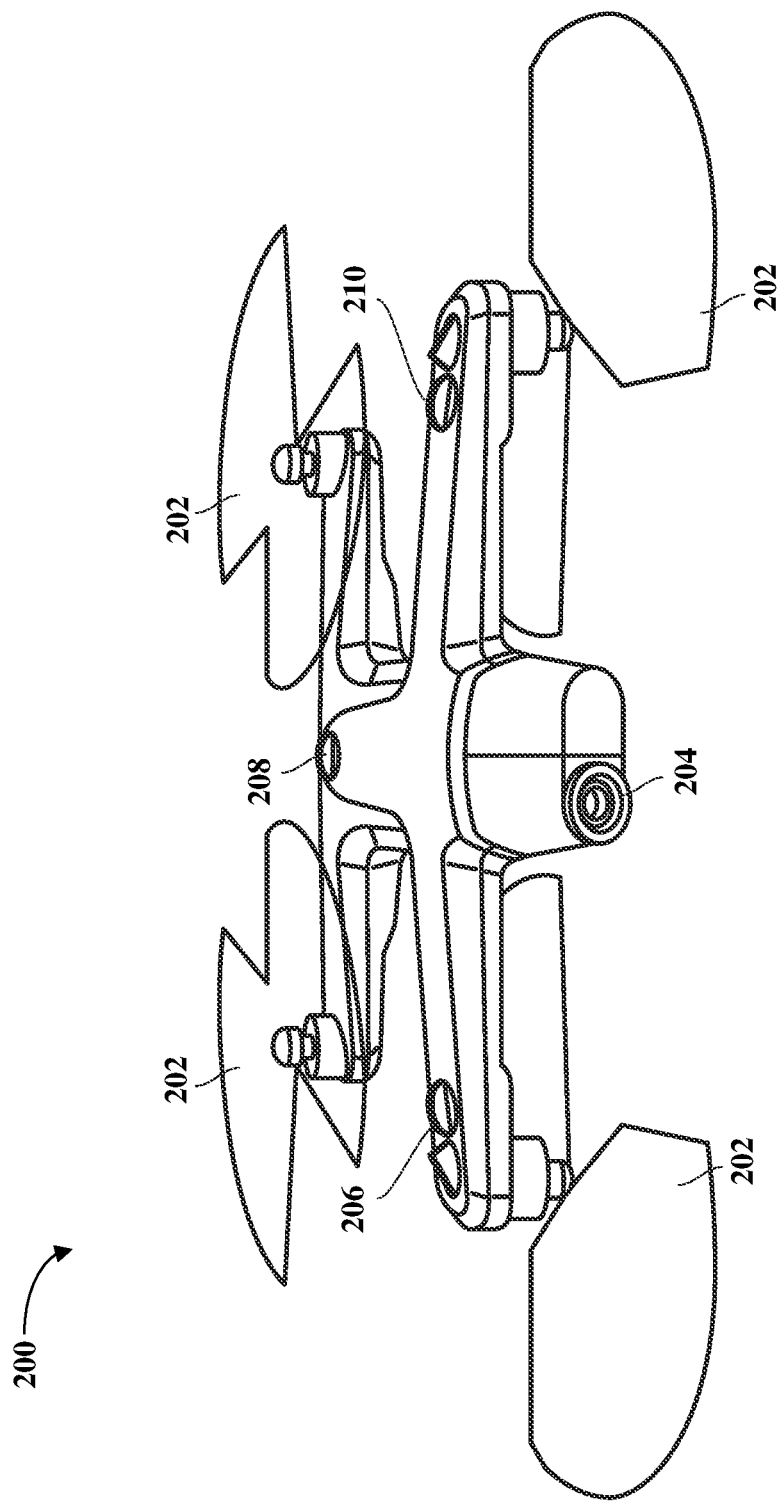
FIG. 2A is an illustration of an example of a UAV as seen from above.
Figure 2B:
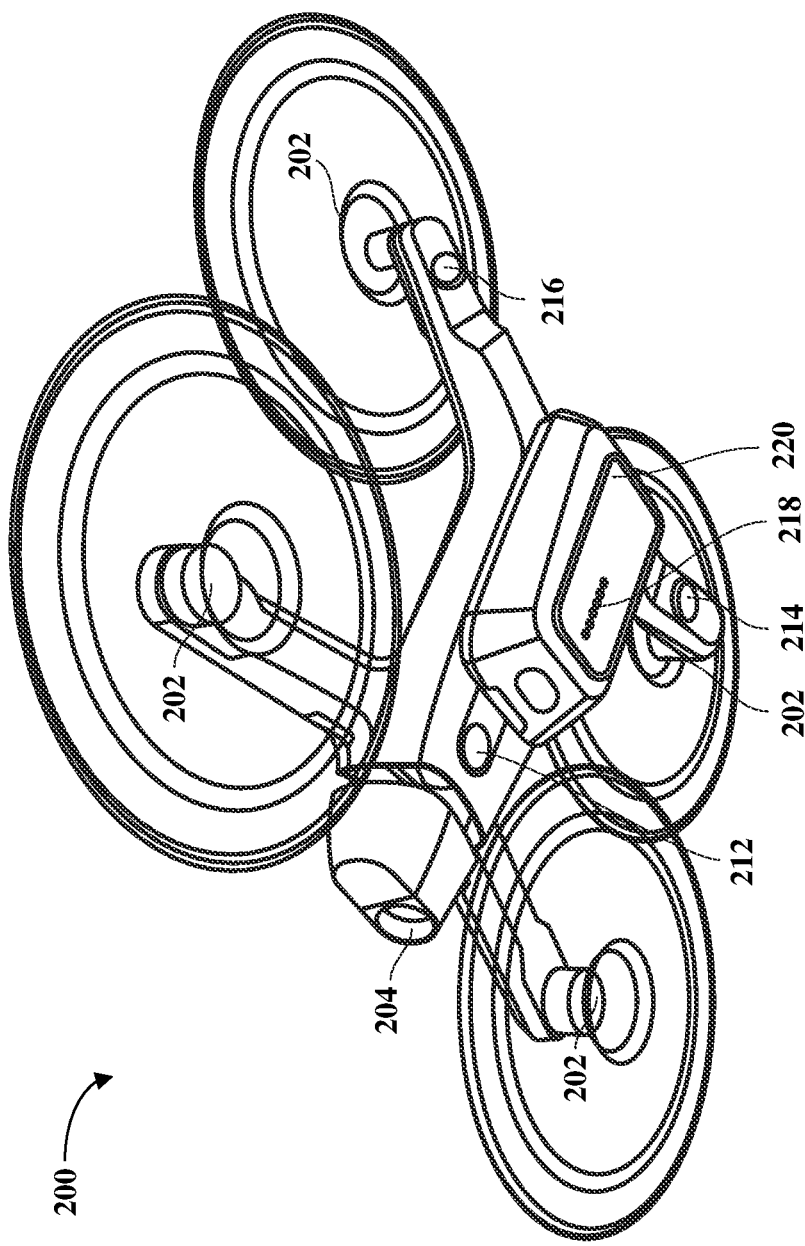
FIG. 2B is an illustration of an example of a UAV as seen from below.
Figure 2C:
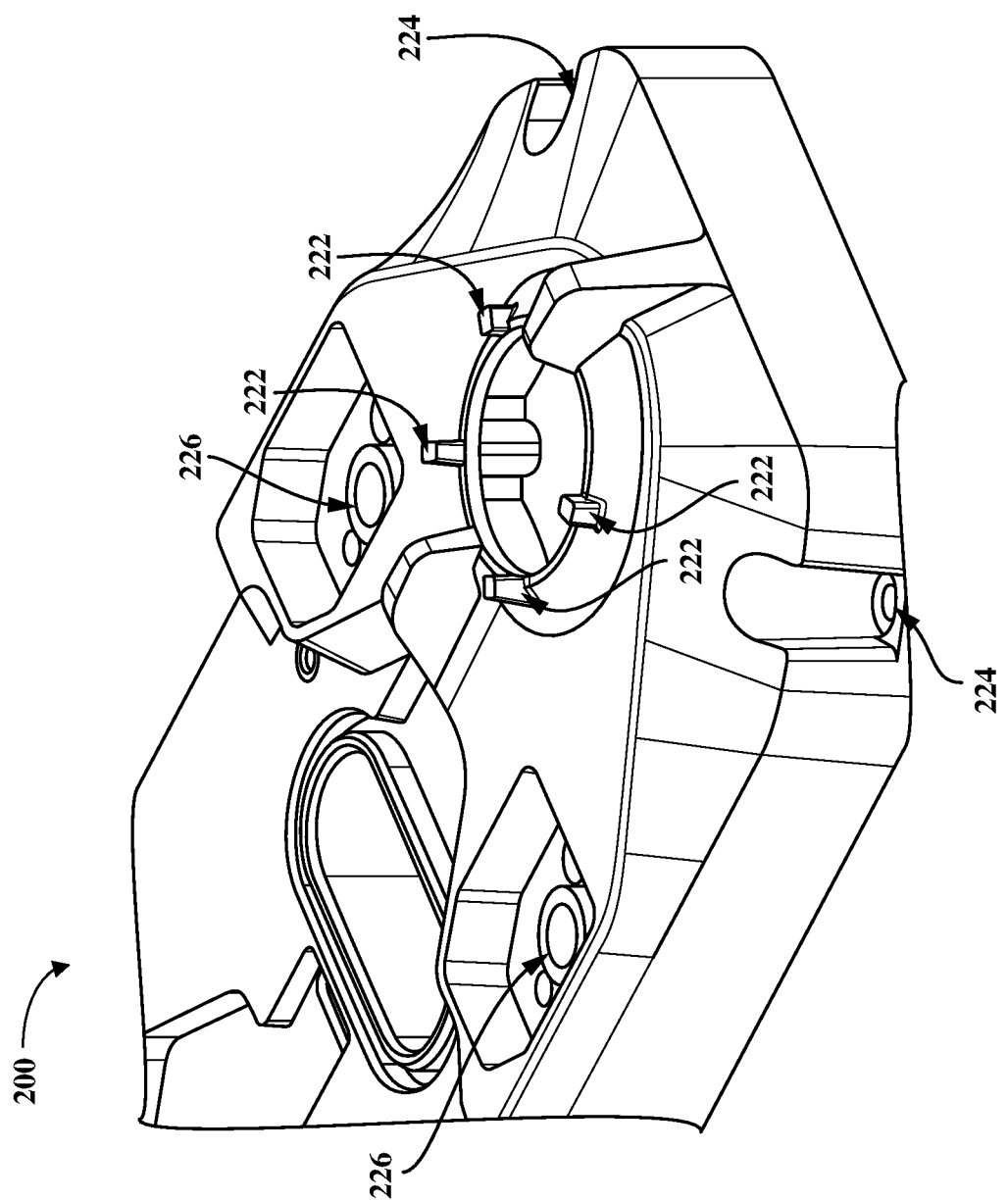
FIG. 2C is an illustration of an example of a portion of a UAV including such a light blocking mechanism.

An example illustration of a UAV 200, which may, for example, be the UAV 102 shown in FIG. 1, is shown in FIGS. 2A-C. FIG. 2A is an illustration of an example of the UAV 200 as seen from above. The UAV 200 includes a propulsion mechanism 202 including some number of propellers (e.g., four) and motors configured to spin the propellers. For example, the UAV 200 may be a quad-copter drone. The UAV 200 includes image sensors, including a high-resolution image sensor 204. This image sensor 204 may, for example, be mounted on a gimbal to support steady, low-blur image capture and object tracking. The UAV 200 also includes image sensors 206, 208, and 210 that are spaced out around the top of the UAV 200 and covered by respective fisheye lenses to provide a wide field of view and support stereoscopic computer vision. The image sensors 206, 208, and 210 generally have a resolution which is lower than a resolution of the image sensor 204. The UAV 200 also includes other internal hardware, for example, a processing apparatus (not shown). In some implementations, the processing apparatus is configured to automatically fold the propellers when entering a dock (e.g., the dock 106 shown FIG. 1), which may allow the dock to have a smaller footprint than the area swept out by the propellers of the propulsion mechanism 202.

FIG. 2B is an illustration of an example of the UAV 200 as seen from below. From this perspective, three more image sensors 212, 214, and 216 arranged on the bottom of the UAV 200 may be seen. These image sensors 212, 214, and 216 may also be covered by respective fisheye lenses to provide a generally wide field of view and support stereoscopic computer vision. The various image sensors of the UAV 200 may enable visual inertial odometry (VIO) for high resolution localization and obstacle detection and avoidance. For example, the image sensors may be used to capture images including infrared data which may be processed for day or night mode navigation of the UAV 200. The UAV 200 also includes a battery in battery pack 220 attached on the bottom of the UAV 200, with conducting contacts 218 to enable battery charging. The bottom surface of the battery pack 220 may be a bottom surface of the UAV 200.

In some implementations, the UAV 200 may include one or more light blocking mechanisms for reducing or eliminating glare at an image sensor otherwise introduced by a light source. FIG. 2C is an illustration of an example of a portion of the UAV 200 including such a light blocking mechanism 222. The light blocking mechanism 222 includes a number of protrusions (e.g., four) coupled to a portion of an arm of the UAV 200. Openings 224 represent locations at which light sources may be coupled. The light sources may, for example, be infrared light emitting diode (LED) elements. In the example shown, two infrared LEDs may be coupled to the arm of the UAV 200. In at least some cases, the infrared LEDs may be omnidirectional. Openings 226 represent locations at which cameras may be coupled. The cameras may, for example, be cameras configured to collect image data including infrared data. In at least some cases, the cameras may have fisheye lenses. Thus, the cameras which may be coupled to the arm of the UAV 200 within the openings 226 may be cameras which do not use or have infrared filtering. In operation, without the light blocking mechanism 222, the light sources coupled to the openings 224 may shine directly into image sensors of the cameras coupled to the openings 226. This direct shining may introduce glare negatively affecting both the ability of the cameras to be used for vision-based navigation functionality of the UAV 200 as well as the quality of images generated based on the data collected using the cameras. The protrusions of the light blocking mechanism 222 thus operate to block light from the light sources coupled to the openings 224 from interfering with the cameras coupled to the openings 226, for example, by reducing or eliminating glare otherwise caused by the light sources directly reaching the image sensors of those cameras. In some implementations, a software infrared light filter may be used in addition to or in lieu of the light blocking mechanism 222.

Figure 3:
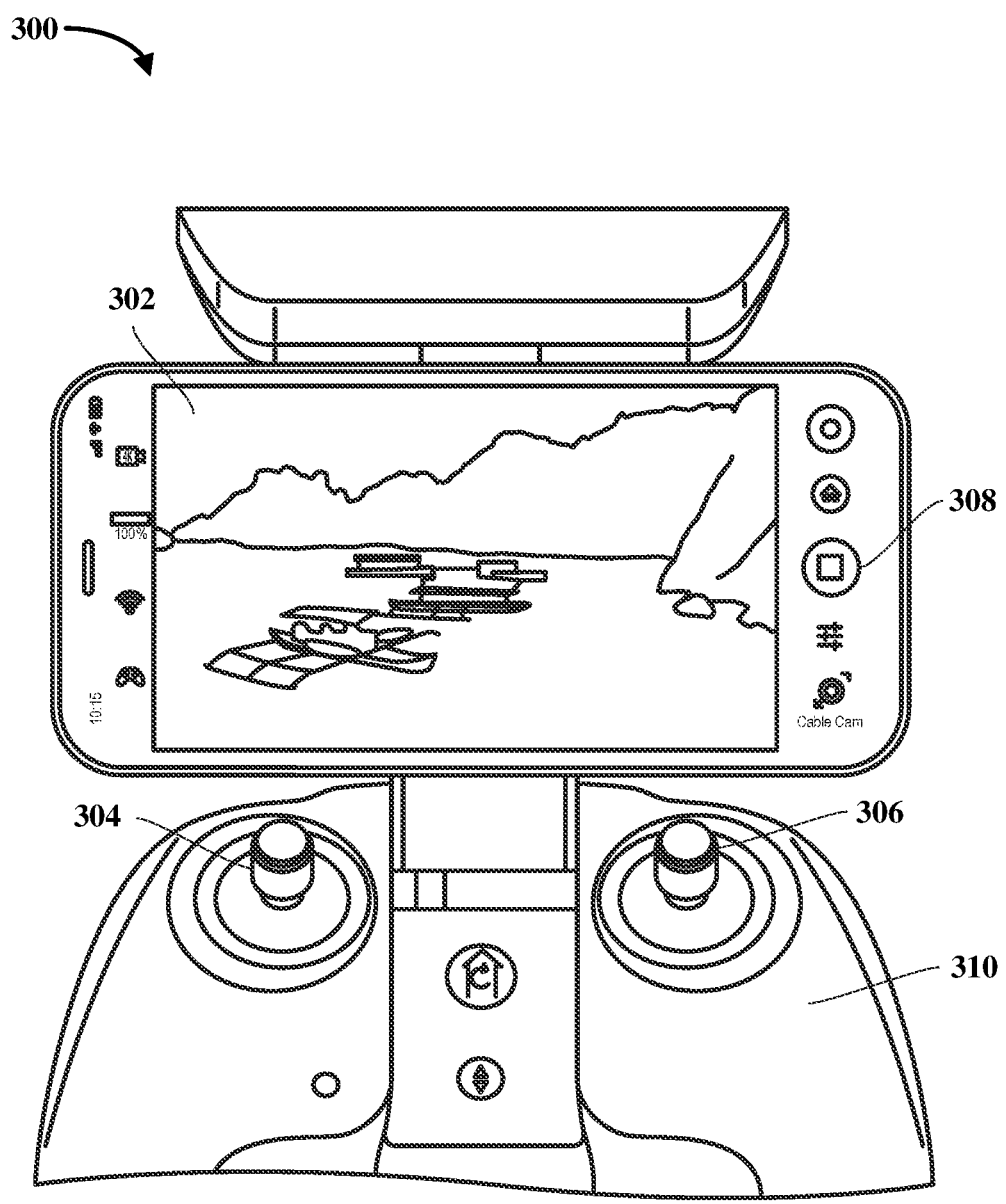
FIG. 3 is an illustration of an example of a controller for a UAV.

FIG. 3 is an illustration of an example of a controller 300 for a UAV, which may, for example, be the UAV 102 shown in FIG. 1. The controller 300 may, for example, be the controller 104 shown in FIG. 1. The controller 300 may provide a user interface for controlling the UAV and reviewing data (e.g., images) received from the UAV. The controller 300 includes a touchscreen 302, a left joystick 304, and a right joystick 306. In the example as shown, the touchscreen 302 is part of a mobile device 308 (e.g., a smartphone) that connects to a controller attachment 310, which, in addition to providing addition control surfaces including the left joystick 304 and the right joystick 306, may provide range extending communication capabilities for longer distance communication with the UAV.

Figure 4:
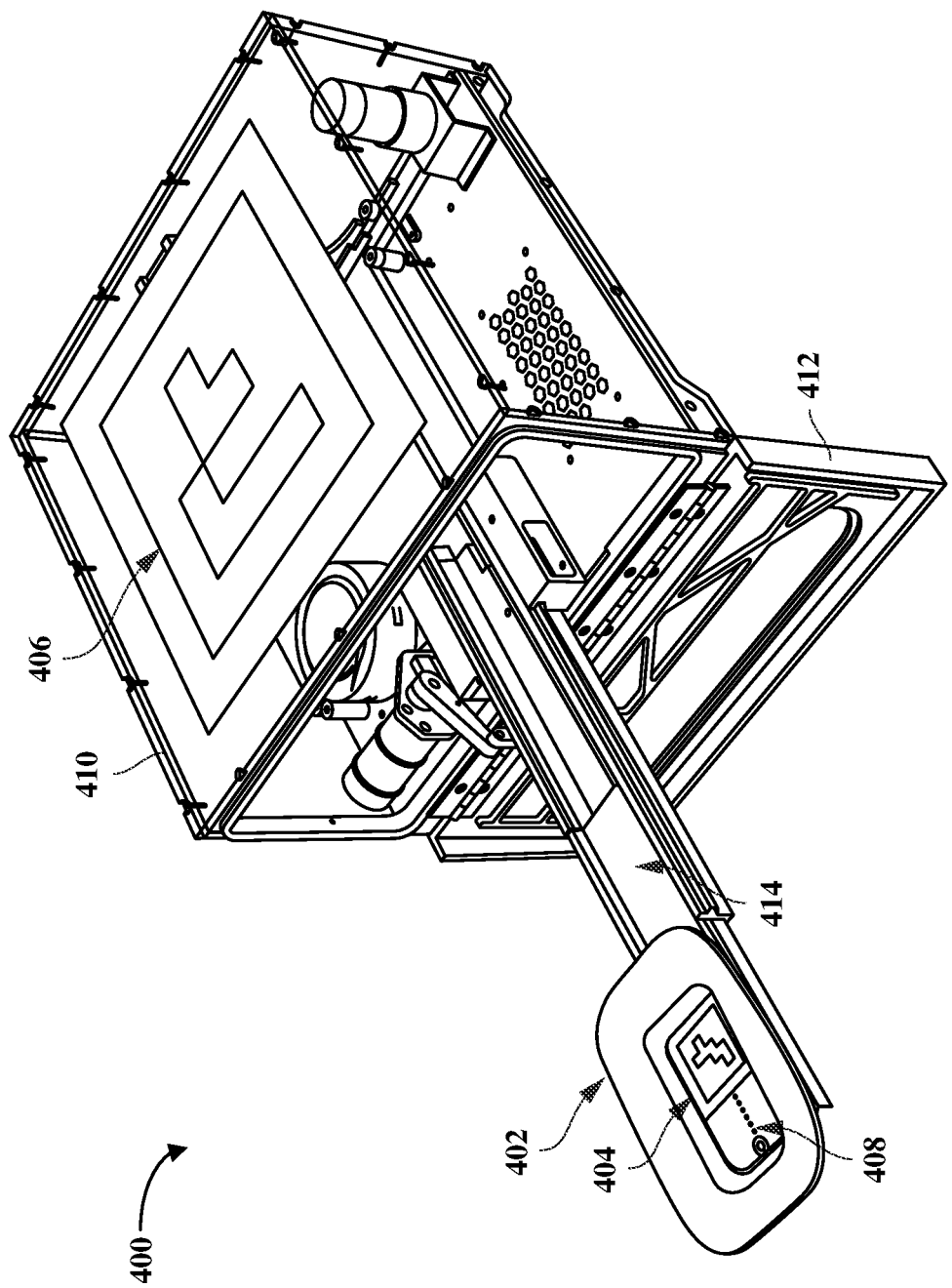
FIG. 4 is an illustration of an example of a dock for facilitating autonomous landing of a UAV

FIG. 4 is an illustration of an example of a dock 400 for facilitating autonomous landing of a UAV, for example, the UAV 102 shown in FIG. 1. The dock may, for example, be the dock 106 shown in FIG. 1. The dock 400 includes a landing surface 402 with a fiducial 404, charging contacts 406 for a battery charger, a box 408 in the shape of a rectangular box with a door 410, and a retractable arm 412.

The landing surface 402 is configured to hold a UAV. The UAV may be configured for autonomous landing on the landing surface 402. The landing surface 402 has a funnel geometry shaped to fit a bottom surface of the UAV at a base of the funnel. The tapered sides of the funnel may help to mechanically guide the bottom surface of the UAV into a centered position over the base of the funnel during a landing. For example, corners at the base of the funnel may server to prevent the aerial vehicle from rotating on the landing surface 402 after the bottom surface of the aerial vehicle has settled into the base of the funnel shape of the landing surface 402. For example, the fiducial 404 may include an asymmetric pattern that enables robust detection and determination of a pose (i.e., a position and an orientation) of the fiducial 404 relative to the UAV based on an image of the fiducial 404, for example, captured with an image sensor of the UAV.

The conducting contacts 406 are contacts of a battery charger on the landing surface 402, positioned at the bottom of the funnel. The dock 400 includes a charger configured to charge a battery of the UAV while the UAV is on the landing surface 402. For example, a battery pack of the UAV (e.g., the battery pack 220 shown in FIG. 2) may be shaped to fit on the landing surface 402 at the bottom of the funnel shape. As the UAV makes its final approach to the landing surface 402, the bottom of the battery pack will contact the landing surface and be mechanically guided by the tapered sides of the funnel to a centered location at the bottom of the funnel. When the landing is complete, the conducting contacts of the battery pack may come into contact with the conducting contacts 406 on the landing surface 402, making electrical connections to enable charging of the battery of the UAV. The dock 400 may include a charger configured to charge the battery while the UAV is on the landing surface 402.

The box 408 is configured to enclose the landing surface 402 in a first arrangement and expose the landing surface 402 in a second arrangement. The dock 400 may be configured to transition from the first arrangement to the second arrangement automatically by performing steps including opening the door 410 of the box 408 and extending the retractable arm 412 to move the landing surface 402 from inside the box 408 to outside of the box 408.

The landing surface 402 is positioned at an end of the retractable arm 412. When the retractable arm 412 is extended, the landing surface 402 is positioned away from the box 408 of the dock 400, which may reduce or prevent propeller wash from the propellers of a UAV during a landing, thus simplifying the landing operation. The retractable arm 412 may include aerodynamic cowling for redirecting propeller wash to further mitigate the problems of propeller wash during landing. The retractable arm supports the landing surface 402 and enables the landing surface 402 to be positioned outside the box 408, to facilitate takeoff and landing of a UAV, or inside the box 408, for storage and/or servicing of a UAV.

In some implementations, the dock 400 includes a second, auxiliary fiducial 414 on an outer surface of the box 408. The root fiducial 404 and the auxiliary fiducial 414 may be detected and used for visual localization of the UAV in relation the dock 400 to enable a precise landing on a small landing surface 402. For example, the fiducial 404 may be a root fiducial, and the auxiliary fiducial 414 is larger than the root fiducial 404 to facilitate visual localization from farther distances as a UAV approaches the dock 400. For example, the area of the auxiliary fiducial 414 may be 25 times the area of the root fiducial 404. For example, the auxiliary fiducial 414 may include an asymmetric pattern that enables robust detection and determination of a pose (i.e., a position and an orientation) of the auxiliary fiducial 414 relative to the UAV based on an image of the auxiliary fiducial 414 captured with an image sensor of the UAV.

Although not illustrated, in some implementations, the dock 400 can include one or more network interfaces for communicating with remote systems over a network, for example, the Internet, a local area network, a wide area network, or another public or private network. The communication may include flight patterns or other flight pattern information. Additionally, the dock 400 can include one or more wireless interfaces for communicating with UAVs, for example, for controlling and/or otherwise providing the UAVs with flight patterns or flight pattern information.

Figure 5:
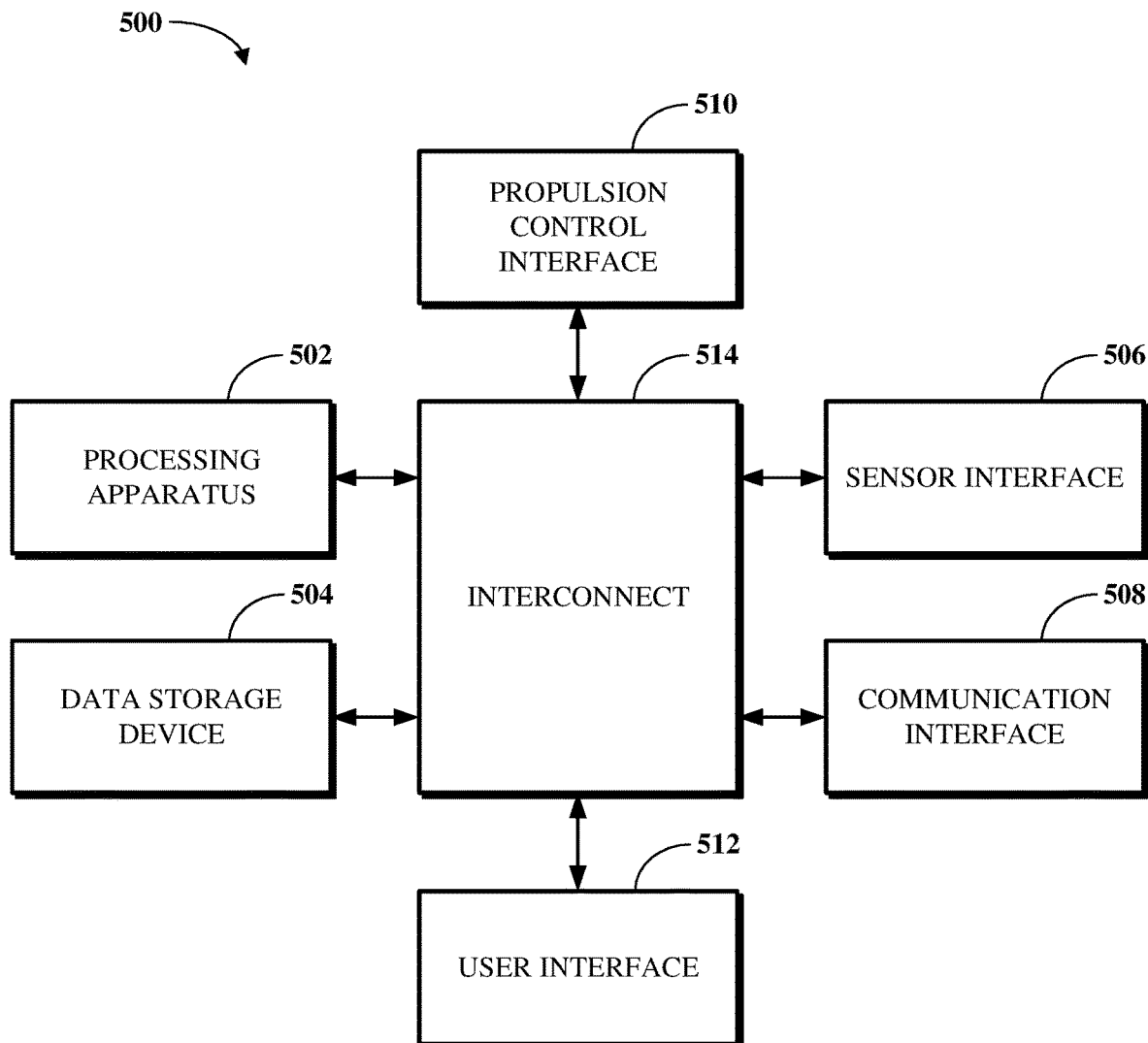
FIG. 5 is a block diagram of an example of a hardware configuration of a UAV.

FIG. 5 is a block diagram of an example of a hardware configuration of a UAV 500, which may, for example, be the UAV 102 shown in FIG. 1. The UAV 500 includes a processing apparatus 502, a data storage device 504, a sensor interface 506, a communications interface 508, propulsion control interface 510, a user interface 512, and an interconnect 514 through which the processing apparatus 502 may access the other components.

The processing apparatus 502 is operable to execute instructions that have been stored in the data storage device 504 or elsewhere. The processing apparatus 502 is a processor with random access memory (RAM) for temporarily storing instructions read from the data storage device 504 or elsewhere while the instructions are being executed. The processing apparatus 502 may include a single processor or multiple processors each having single or multiple processing cores. Alternatively, the processing apparatus 502 may include another type of device, or multiple devices, capable of manipulating or processing data.

The data storage device 504 is a non-volatile information storage device, for example, a solid-state drive, a read-only memory device (ROM), an optical disc, a magnetic disc, or another suitable type of storage device such as a non-transitory computer readable memory. The data storage device 504 may include another type of device, or multiple devices, capable of storing data for retrieval or processing by the processing apparatus 502. The processing apparatus 502 may access and manipulate data stored in the data storage device 504 via the interconnect 514, which may, for example, be a bus or a wired or wireless network (e.g., a vehicle area network).

The sensor interface 506 is configured to control and/or receive data from one or more sensors of the UAV 500. The data may refer, for example, to one or more of temperature measurements, pressure measurements, a global positioning system (GPS) data, acceleration measurements, angular rate measurements, magnetic flux measurements, a visible spectrum image, an infrared image, an image including infrared data and visible spectrum data, and/or other sensor output. For example, the one or more sensors from which the data is generated may include single or multiple of one or more of an image sensor, an accelerometer, a gyroscope, a geolocation sensor, a barometer, and/or another sensor. In some implementations, the sensor interface 506 may implement a serial port protocol (e.g., I2C or SPI) for communications with one or more sensor devices over conductors. In some implementations, the sensor interface 506 may include a wireless interface for communicating with one or more sensor groups via low-power, short-range communications techniques (e.g., using a vehicle area network protocol).

The communications interface 508 facilitates communication with one or more other devices, for example, a paired dock (e.g., the dock 106), a controller (e.g., the controller 104), or another device, for example, a user computing device (e.g., a smartphone, tablet, or other device). The communications interface 508 may include a wireless interface and/or a wired interface. For example, the wireless interface may facilitate communication via a Wi-Fi network, a Bluetooth link, a ZigBee link, or another network or link. In another example, the wired interface may facilitate communication via a serial port (e.g., RS-232 or USB). The communications interface 508 further facilitates communication via a network, which may, for example, be the Internet, a local area network, a wide area network, or another public or private network.

The propulsion control interface 510 is used by the processing apparatus to control a propulsion system of the UAV 500 (e.g., including one or more propellers driven by electric motors). For example, the propulsion control interface 510 may include circuitry for converting digital control signals from the processing apparatus 502 to analog control signals for actuators (e.g., electric motors driving respective propellers). In some implementations, the propulsion control interface 510 may implement a serial port protocol (e.g., I2C or SPI) for communications with the processing apparatus 502. In some implementations, the propulsion control interface 510 may include a wireless interface for communicating with one or more motors via low-power, short-range communications (e.g., a vehicle area network protocol).

The user interface 512 allows input and output of information from/to a user. In some implementations, the user interface 512 can include a display, which can be a liquid crystal display (LCD), a light emitting diode (LED) display (e.g., an OLED display), or another suitable display. In some such implementations, the user interface 512 may be or include a touchscreen. In some implementations, the user interface 512 may include one or more buttons. In some implementations, the user interface 512 may include a positional input device, such as a touchpad, touchscreen, or the like, or another suitable human or machine interface device.

In some implementations, the UAV 500 may include one or more additional components not shown in FIG. 5. In some implementations, one or more components shown in FIG. 5 may be omitted from the UAV 500, for example, the user interface 512.

Figure 6:
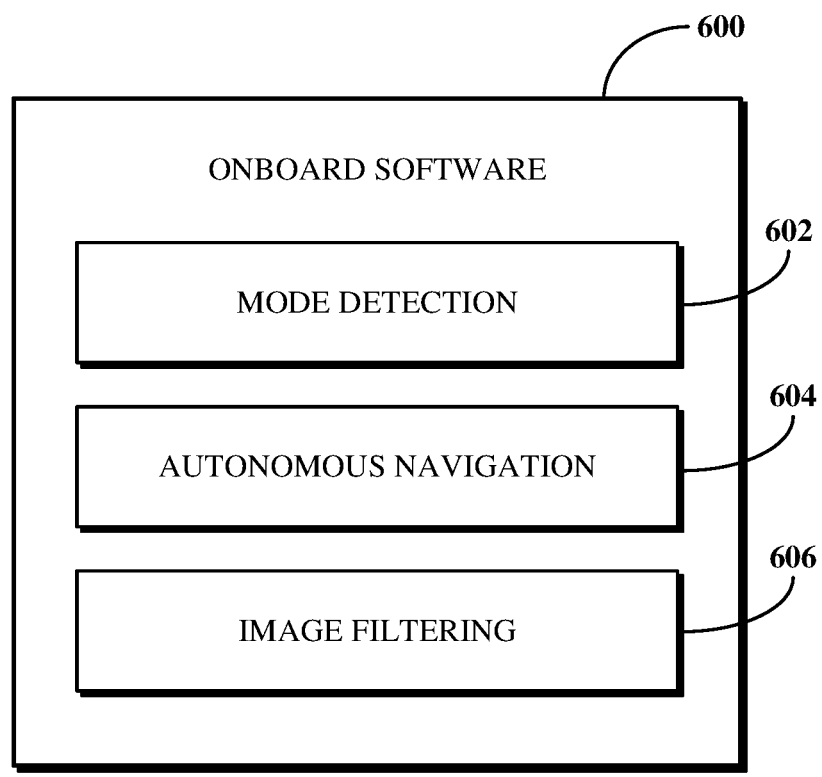
FIG. 6 is a block diagram of example software functionality of a UAV system.

FIG. 6 is a block diagram of example software functionality of a UAV system, which may, for example, be the system 100 shown in FIG. 1. In particular, the software functionality is represented as onboard software 600 running at a UAV, for example, the UAV 102 shown in FIG. 1. The onboard software 600 includes a mode detection tool 602, an autonomous navigation tool 604, and an image filtering tool 606.

The mode detection tool 602 configures the UAV for operation in either a day mode or a night mode. The mode detection tool 602 configures the UAV for day mode operation where a determination is made that an amount of light within the environment in which the UAV is located is sufficient for vision-based navigation of the UAV without use of light sources onboard the UAV. The determination as to whether the amount of light within the environment in which the UAV is located is sufficient for vision-based navigation may be based on one or more of a threshold defined for one or more cameras used for the vision-based navigation, an exposure setting for those one or more cameras, a measurement of light within the environment using another sensor onboard the UAV or another sensor the output of which is reportable to the UAV system, or the like. For example, determining whether to configure the UAV in a day mode configuration or the night mode configuration based on an amount of light within the environment in which the UAV is operating can include measuring an intensity of light within the environment in which the UAV is operating, and automatically configuring the UAV in one of a day mode configuration or a night mode configuration based on the intensity of light, wherein the UAV is automatically configured in the day mode configuration based on the intensity of light meeting a threshold or in the night mode configuration based on the intensity of light not meeting the threshold. The determination may be made prior to takeoff. Alternatively, the determination may be made after some or all takeoff operations have been performed.

The mode detection tool 602 determines which of day mode or night mode applies at a given time and so that configurations of that determined mode may be applied for the operation of the UAV. In particular, when a determination is made to use day mode configurations, onboard light sources (e.g., infrared LEDs) of the UAV may be temporarily and selectively disabled to prevent unnecessary or otherwise undesirable illumination. For example, temporarily disabling infrared LEDs may limit an amount of infrared light which is collected by the image sensors of the cameras used for the vision-based navigation of the UAV in day mode. Other configuration changes to the UAV may also be made as a result of switching from day mode to night mode or from night mode to day mode.

The autonomous navigation tool 604 includes functionality for enabling autonomous flight of the UAV. Regardless of whether the UAV is in day mode or night mode, autonomous flight functionality of the UAV generally includes switching between the use of cameras for vision-based navigation and the use of a global navigation satellite system (GNSS) and an inertial measurement unit (IMU) onboard the UAV for position-based navigation. In particular, autonomous flight of the UAV may use position-based navigation where objects within an environment in which the UAV is operating are determined to be at least some distance away from the UAV, and autonomous flight of the UAV may instead use vision-based navigation where those objects are determined to be less than that distance away from the UAV.

With position-based navigation, the UAV may receive a series of location signals through a GNSS receiver. The received GNSS signals may be indicative of locations of the UAV within a world frame of reference. The UAV may use the location signals from the GNSS receiver to determine a location and velocity of the UAV. The UAV may determine an acceleration signal and an orientation signal within a navigation frame of reference based on acceleration signals from one or more accelerometers and angular rate signals from one or more gyroscopes, such as which may be associated with the IMU onboard the UAV.

With vision-based navigation, one or more onboard cameras of the UAV may continuously or otherwise periodically collect data usable to generate images. The image may be processed in real-time or substantially in real-time to identify objects within the environment in which the UAV is operated and to determine a relative position of the UAV with respect to those objects. Depth estimation may be performed to determine the relative position of the UAV with respect to an object. Based on the depth estimation values and output from the onboard IMU, the trajectory of the UAV toward a detected object may be evaluated to enable the UAV to avoid object collision.

The manner by which autonomous flight functionality is achieved using vision-based navigation or position-based navigation depends upon whether the UAV is in day mode or night mode. As described above with respect to FIG. 2C, the UAV may include one or more cameras which do not have or use infrared filters. These onboard cameras thus collect image data which includes infrared data. However, as has been noted, infrared data can obscure the ultimate look of an image and thus may interfere with conventional image processing for vision-based navigation. Thus, when the UAV is in day mode, infrared data may be filtered out of the images used for vision-based navigation, for example, as described below with respect to the image filtering tool 608. The infrared filtered images may then be processed using RGB-based depth estimation as described above.

When the UAV is in night mode, and thus while infrared LEDs onboard the UAV are used to illuminate the environment in which the UAV is operating, the cameras will collect infrared data and a different technique for depth estimation in the infrared domain is used. In particular, in night mode, the autonomous navigation tool 604 includes or uses intelligence for low-light and no-light depth estimation within the infrared domain. The intelligence may be an algorithm, machine learning model, or other aspect configured to take in some input in the form of image data including infrared data and generate some output usable by or for the vision-based navigation functionality of the UAV.

It is further noted that, due to the limited range of infrared LEDs, illumination reflections received by the onboard cameras of the UAV based on infrared light may result in the vision-based navigation functionality of the UAV being less reliable at some ranges than if that functionality otherwise used non-infrared light. Thus, in night mode, the distance representing the threshold at which vision-based navigation is used may be less than the distance used in day mode.

The image filtering tool 606 filters images generated using collected image data which includes infrared data to remove the infrared data therefrom. Because night mode operation of the UAV includes the use of infrared data, the image filtering tool 606 may include or otherwise refer to functionality performed for images generated while the UAV is in day mode. Thus, when the UAV is in day mode and an image is generated using image data collected from one or more onboard cameras of the UAV, that image data is processed using the image filtering tool 608 to prepare the image data for use in vision-based navigation for the UAV.

Filtering the image data to remove infrared data therefrom includes modifying the appearance of the image data, which may have a somewhat pink tonal appearance than image data collected using a camera which has or uses an infrared filter, to reduce or eliminate those pink tones. Those pink tones skew the perceptible quality of images and thus may negatively impact the functionality of day mode vision-based navigation and/or the overall appearance and quality of output presented to the operator the UAV. The filter applied by the image filtering tool 608 may be modeled based on software infrared filters which may be used for cameras.

In some implementations, the image filtering tool 606 may be omitted. For example, the UAV may include both cameras which have or use infrared filters and cameras which do not have or use infrared filters. A camera which has or uses an infrared filter may use a software process for infrared filtering, a mechanical component for infrared filtering, or both. The cameras which have or use the infrared filters may be used for vision-based navigation of the UAV while the UAV is in day mode, and the cameras which do not have or use infrared filters may be used for vision-based navigation of the UAV while the UAV is in night mode. In another example, the autonomous navigation tool 604 and other aspects disclosed herein may operate against images that include both visible and infrared light.

Figure 7:
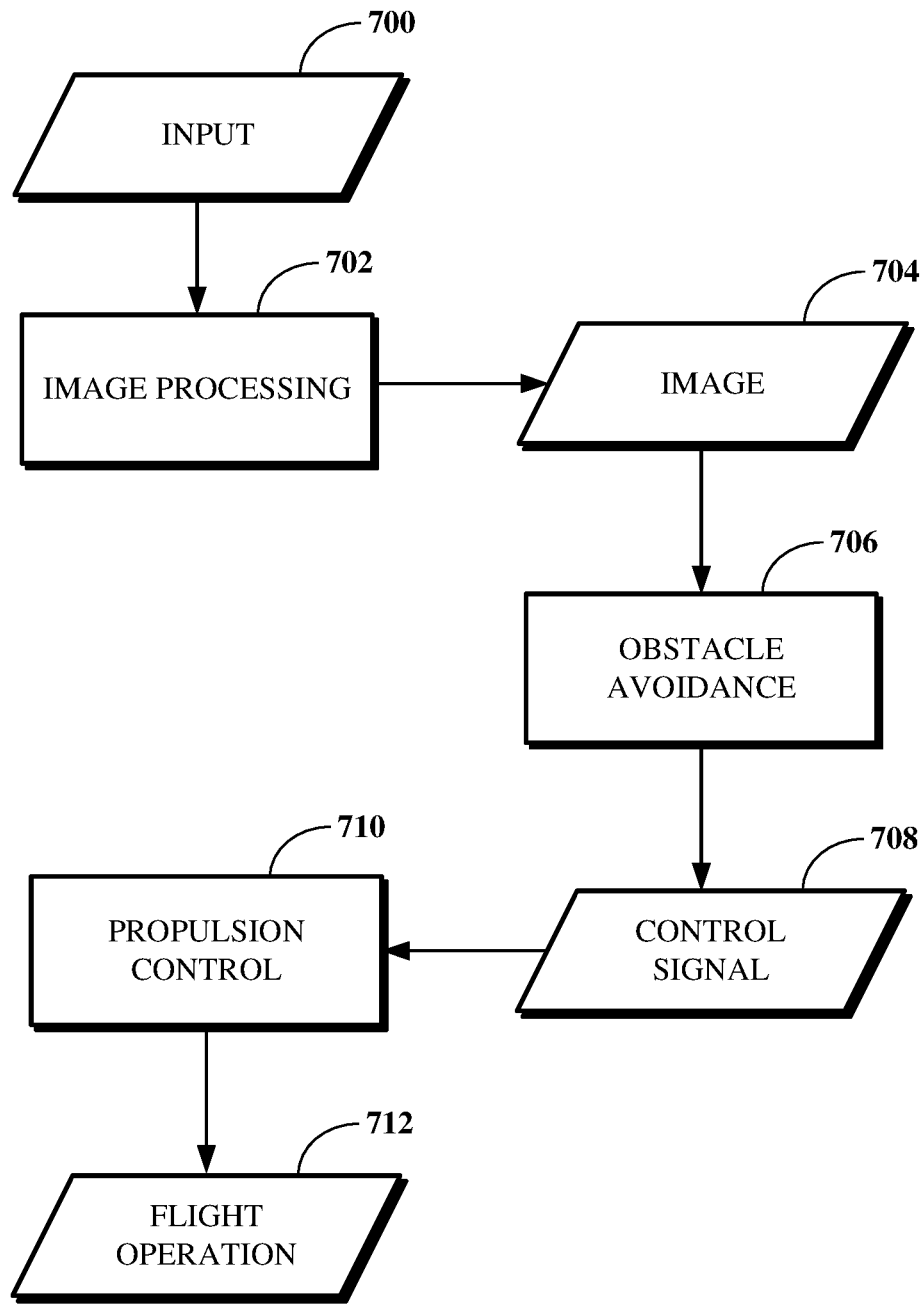
FIG. 7 is a block diagram of example of UAV navigation using night mode obstacle avoidance intelligence.

FIG. 7 is a block diagram of example of UAV navigation using night mode obstacle avoidance intelligence. At least some of the operations shown and described with respect to FIG. 7 may, for example, be performed by or using the automated navigation tool 604 shown in FIG. 6. Input 700 representing input which can be collected by a camera of a UAV, for example, the UAV 102 shown in FIG. 1, is collected and processed using an image processing tool 702 to produce an image 704. The input 700 may, for example, include image data including infrared data measured using an image sensor of an onboard camera of the UAV. The image processing tool 702 represents software usable to produce the image 704 from the input 700. The image 704 is produced based on the infrared data of the input 700 and thus includes infrared aspects. However, in some implementations, the image 704 may be produced based on data other than infrared data. For example, the input 700 may include data measured from visible light and/or another form of light other than infrared light.

The image 704 is provided to an obstacle avoidance tool 706, which detects objects within the image 704. The obstacle avoidance tool 706 includes or uses intelligence to indicate a detection of a number of objects within the image 704. Where objects are detected, the obstacle avoidance tool 706 uses the indication to determine a flight operation to prevent a collision by the UAV with the detected obstacle. The flight operation includes or refers to a maneuver for the UAV which changes a current path of the UAV to prevent the UAV from colliding with the detected object.

The obstacle avoidance tool 706 outputs a control signal 708 including a command configured to cause the flight operation for preventing the collision by the UAV with the detected obstacle. The control signal 708 is received and processed by a propulsion control tool 710 of the UAV. The propulsion control tool 710 is configured to interface with one or more components associated with a propulsion system of the UAV to implement the flight operation associated with the control signal 708. The output of the propulsion control tool 710 is a flight operation 712 performed or performable by the UAV.

Figure 8:
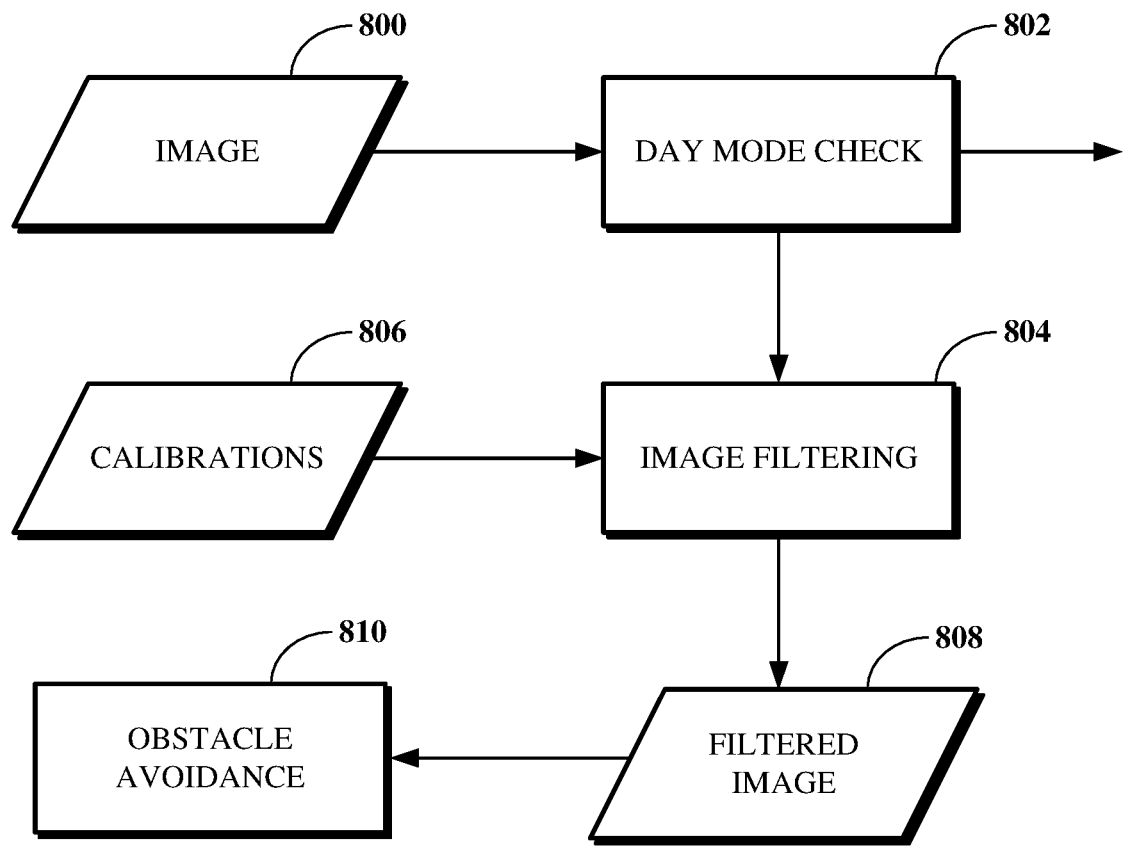
FIG. 8 is a block diagram of an example of UAV navigation in day mode by filtering infrared data from images.

FIG. 8 is a block diagram of an example of UAV navigation in day mode by filtering infrared data from images. At least some of the operations shown and described with respect to FIG. 8 may, for example, be performed by or using the image filtering tool 606 shown in FIG. 6. An image 800 is produced by image processing functionality of a UAV (e.g., the image processing tool 702 shown in FIG. 7) based on image data including infrared data collected by a camera of the UAV. The image 800 may, for example, be the image 704 shown in FIG. 7 and thus includes infrared data. A day mode check tool 802 checks whether the UAV is operating in day mode or night mode. Where the day mode check tool 802 determines that the UAV is operating in night mode, the remaining operations shown and described with respect to FIG. 8 are bypassed and the image 800 is further processed for autonomous vision-based navigation without filtering.

Where the day mode check tool 802 determines that the UAV is operating in day mode, an image filtering tool 804 performs filtering against the image 800 based on calibrations 806 to produce a filtered image 808. The filtering performed by the image filtering tool 804 reduces or otherwise entirely removes infrared data from the image 800. Thus, the filtered image 808 represents the image 800 with less or otherwise without infrared data. The image filtering tool 804 may, for example, apply a filter for removing pink tones within the image 800 resulting from the collection of infrared data and use of same to produce the image 800. The calibrations include or refer to settings used for the filtering performed by the image filtering tool 804. In some implementations, the calibrations may be defined based on one or more configurations of the camera used to collect the image data processed to produce the image 800.

The filtered image 808 is thereafter used as input to an obstacle avoidance tool 810, which processes the filtered image to detect a number of objects within an environment in which the UAV is operating. Autonomous vision-based navigation in day mode is then facilitated based on the output of the obstacle avoidance tool 810.

Figure 9:
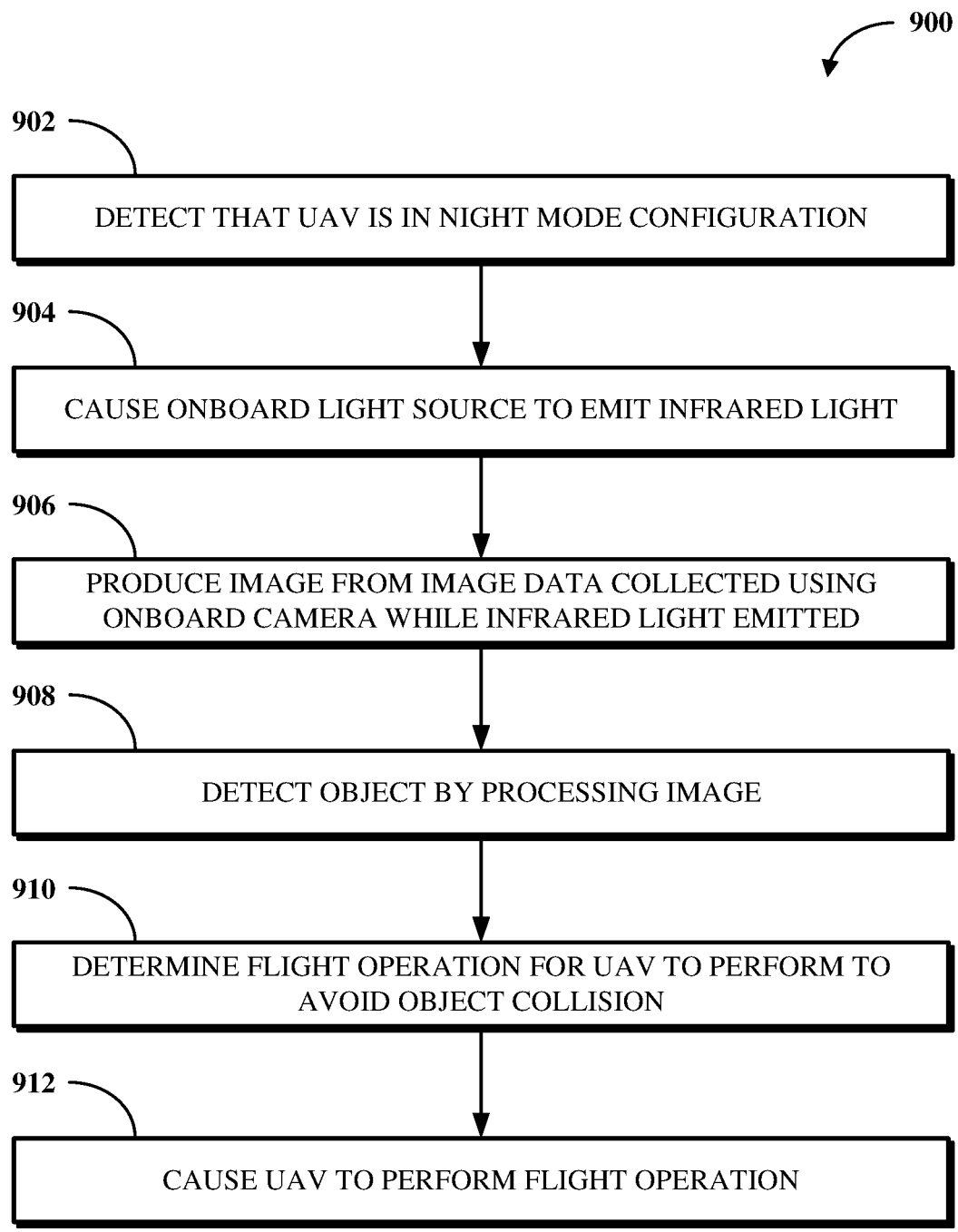
FIG. 9 is a flowchart of an example of a technique for night mode obstacle avoidance.
Figure 10:
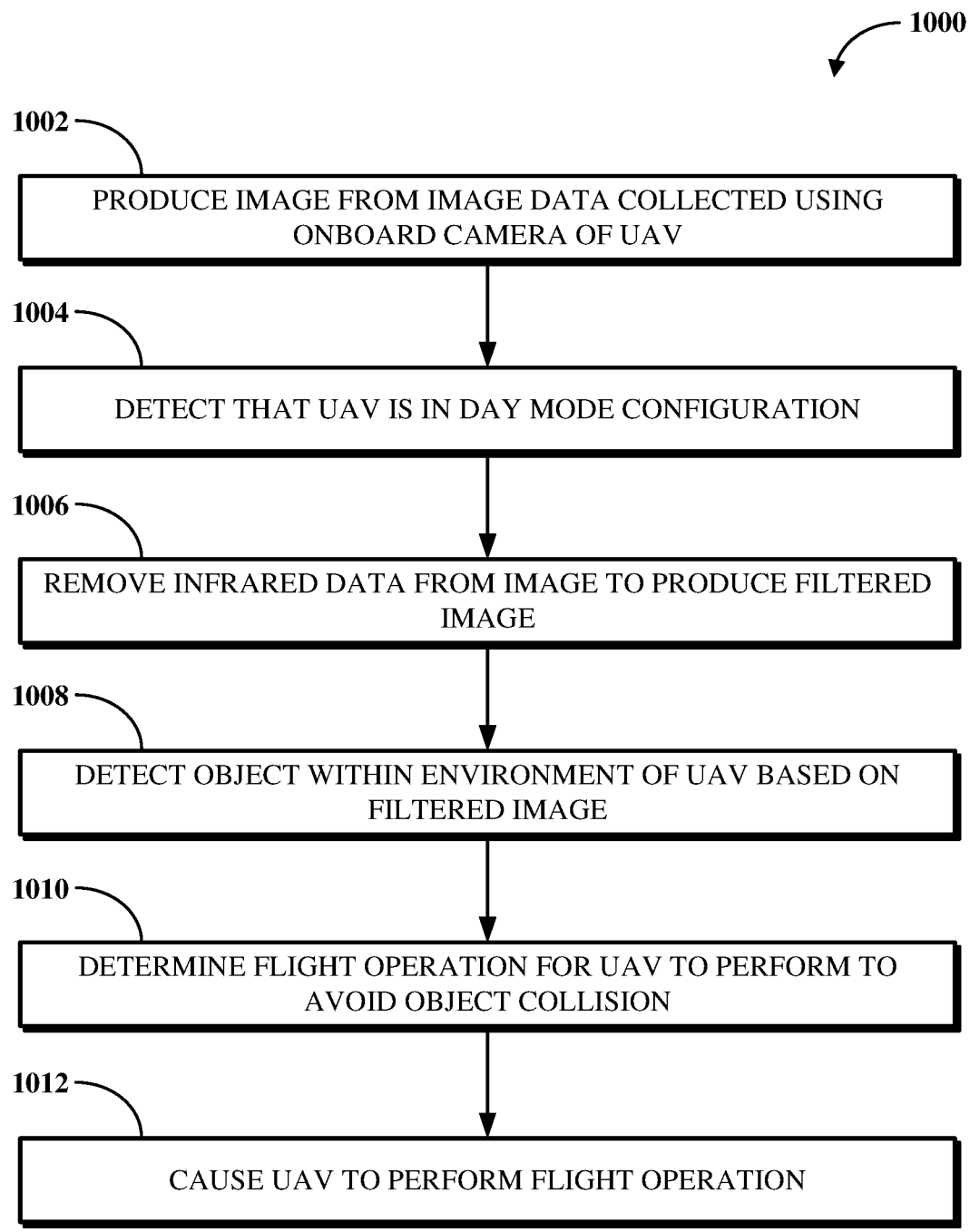
FIG. 10 is a flowchart of an example of a technique for filtering infrared data from images processed during day mode operations of a UAV.

To further describe some implementations in greater detail, reference is next made to examples of techniques for autonomous aerial navigation in low-light and no-light conditions, for example, as described with respect to FIGS. 1-8. FIG. 9 is a flowchart of an example of a technique 900 for night mode obstacle avoidance. FIG. 10 is a flowchart of an example of a technique 1000 for filtering infrared data from images processed during day mode operations of a UAV.

The techniques 900 and/or 1000 can be executed using computing devices, such as the systems, hardware, and software described with respect to FIGS. 1-8. The techniques 900 and/or 1000 can be performed, for example, by executing a machine-readable program or other computer-executable instructions, such as routines, instructions, programs, or other code. The steps, or operations, of the techniques 900 and/or 1000 or another technique, method, process, or algorithm described in connection with the implementations disclosed herein can be implemented directly in hardware, firmware, software executed by hardware, circuitry, or a combination thereof.

For simplicity of explanation, the techniques 900 and 1000 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 9, the flowchart of the example of the technique 900 for night mode obstacle avoidance is shown. At 902, a UAV is detected to be in a night mode configuration based on an amount of light within an environment in which the UAV is operating. At 904, an onboard light source of the UAV is caused to emit an infrared light based on the night mode configuration of the UAV. At 906, an image is produced from image data collected using an onboard camera of an UAV while the onboard light source emits the infrared light, in which the image data includes infrared data. At 908, an object is detected within the environment in which the UAV is operating based on the image. At 910, a flight operation for the UAV to perform to avoid a collision with the object is determined. At 912, the UAV is caused to perform the flight operation.

In some implementations, the technique 900 may be performed to cause a performance of a flight operation based on light other than infrared light emitted from an onboard light source of the UAV. For example, an onboard light source of the UAV may be equipped or otherwise configured to emit visible light and/or another form of light other than infrared light. In such a case, an image may be produced from image data collected using the onboard camera of the UAV while the onboard light source of the UAV emits that visible light and/or other form of light, an object may be detected within the environment in which the UAV is operating based on the age, and the flight operation to be performed to avoid a collision with that object may be determined.

Referring next to FIG. 10, the flowchart of the example of the technique 1000 for filtering infrared data from images processed during day mode operations of a UAV is shown. At 1002, an image is produced from image data collected using an onboard camera of a UAV, wherein the image data includes infrared data. At 1004, the UAV is detected to be in a day mode configuration based on an amount of light within an environment in which the unmanned aerial vehicle is operating. At 1006, at least some of the infrared data is removed from the image based on the day mode configuration and calibrations associated with the onboard camera to produce a filtered image. At 1008, an object is detected within the environment in which the UAV is operating based on the filtered image. At 1010, a flight operation for the UAV to perform to avoid a collision with the object is determined. At 1012, the UAV is caused to perform the flight operation.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices.

Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   causing an onboard light source of an unmanned aerial vehicle to emit infrared light while the unmanned aerial vehicle is in a night mode configuration;
   collecting image data using an onboard camera of the unmanned aerial vehicle while the onboard light source emits the infrared light;
   filtering the image data to reduce pink tones within the image data;
   detecting an object within an environment in which the unmanned aerial vehicle is operating based on the filtered image data;
   determining a flight operation for the unmanned aerial vehicle to avoid a collision with the object; and
   causing the unmanned aerial vehicle to perform the flight operation.

2. The method of claim 1, comprising:
   measuring an intensity of light within the environment in which the unmanned aerial vehicle is operating; and
   automatically configuring the unmanned aerial vehicle in one of a day mode configuration or the night mode configuration based on the intensity of light,
   wherein the unmanned aerial vehicle is automatically configured in the day mode configuration based on the intensity of light meeting a threshold, and wherein the unmanned aerial vehicle is automatically configured in the night mode configuration based on the intensity of light not meeting the threshold.

3. The method of claim 2, wherein the onboard camera includes a first onboard camera used while the unmanned aerial vehicle is in the night mode configuration and a second onboard camera while the unmanned aerial vehicle is in the day mode configuration.

4. The method of claim 2, wherein the unmanned aerial vehicle is configured to switch between the night mode configuration and the day mode configuration based on a change in an amount of light within the environment in which the unmanned aerial vehicle is operating or based on the unmanned aerial vehicle navigating to a new environment.

5. The method of claim 1, wherein the filtered image data includes infrared data and detecting the object within the environment in which the unmanned aerial vehicle is operating based on the filtered image data comprises:
   performing depth estimation in the infrared domain to determine a relative position of the unmanned aerial vehicle with respect to the object.

6. The method of claim 1, wherein the unmanned aerial vehicle includes one or more protrusions coupled to one or more arms of the unmanned aerial vehicle, wherein the one or more protrusions are configured to reduce an amount of glare caused by the infrared light emitted by the onboard light source from reaching an image sensor of the onboard camera.

7. The method of claim 2, wherein the onboard light source is selectively disabled while the unmanned aerial vehicle is in the day mode configuration.

8. An unmanned aerial vehicle, comprising:
   an onboard light source configured to emit infrared light while the unmanned aerial vehicle is in a night mode configuration;

an onboard camera configured to collect image data including infrared data while the onboard light source emits the infrared light; and one or more processors configured to run onboard software for processing the image data to determine a flight operation for the unmanned aerial vehicle to avoid an object collision, wherein processing the image data includes filtering the image data using infrared filtering software to reduce pink tones within the image data.

9. The unmanned aerial vehicle of claim 8, wherein the onboard software run by the one or more processors determines whether to configure the unmanned aerial vehicle is in a day mode configuration or the night mode configuration based on an amount of light within an environment in which the unmanned aerial vehicle is operating.

10. The unmanned aerial vehicle of claim 9, wherein the onboard camera includes a first onboard camera used while the unmanned aerial vehicle is in the night mode configuration and a second onboard camera used while the unmanned aerial vehicle is in the day mode configuration.

11. The unmanned aerial vehicle of claim 9, wherein the onboard light source is disabled while the unmanned aerial vehicle is in the day mode configuration.

12. The unmanned aerial vehicle of claim 8, comprising:
one or more protrusions coupled to one or more arms of the unmanned aerial vehicle, wherein the one or more protrusions are configured to reduce an amount of glare caused by the infrared light emitted by the onboard light source from reaching an image sensor of the onboard camera.

13. The unmanned aerial vehicle of claim 12, wherein the one or more protrusions partially surround the onboard camera.

14. An apparatus, comprising:
one or more processors; and
a memory storing instructions that, when executed by the one or more processors, cause the one or more processors to:
determine whether to configure an unmanned aerial vehicle in a day mode configuration or a night mode configuration;
responsive to a determination to configure the unmanned aerial vehicle in the day mode configuration:
capture first image data using infrared filtering software including filtering the first image data to reduce pink tones within the first image data;
determine a first flight operation for the unmanned aerial vehicle to avoid collision with a first object detected within an environment in which the unmanned aerial vehicle is operating based on the filtered first image data; and
cause the unmanned aerial vehicle to perform the first flight operation; and
responsive to a determination to configure the unmanned aerial vehicle in the night mode configuration:
capture second image data including infrared data;
determine a second flight operation for the unmanned aerial vehicle to avoid collision with a second object detected within an environment in which the unmanned aerial vehicle is operating based on the second image data; and
cause the unmanned aerial vehicle to perform the second flight operation.

15. The apparatus of claim 14, wherein the determination as to whether to configure the unmanned aerial vehicle in the day mode configuration or the night mode configuration is based on an amount of light within the environment in which the unmanned aerial vehicle is operating.

16. The apparatus of claim 15, wherein, to determine whether to configure the unmanned aerial vehicle in the day mode configuration or the night mode configuration, the instructions, when executed by the one or more processors, cause the one or more processors to:
determine whether the amount of light within the environment in which the unmanned aerial vehicle is operating is sufficient for vision-based navigation based on one or more of a threshold defined for one or more cameras of the unmanned aerial vehicle, an exposure setting of the one or more cameras, or a measurement of light captured using an onboard sensor of the unmanned aerial vehicle.

17. The apparatus of claim 15, wherein the instructions, when executed by the one or more processors, cause the one or more processors to:
detect the second object based on the second image data; and
perform depth estimation in the infrared domain to determine a relative position of the unmanned aerial vehicle with respect to the second object.

18. The apparatus of claim 14, wherein the unmanned aerial vehicle includes one or more protrusions coupled to one or more arms of the unmanned aerial vehicle, wherein the one or more protrusions are configured to reduce an amount of glare caused by an infrared light emitted by an onboard light source of the unmanned aerial vehicle from reaching an image sensor of an onboard camera of the unmanned aerial vehicle.

19. The apparatus of claim 14, wherein a first onboard camera is used while the unmanned aerial vehicle is in the night mode configuration and a second onboard camera is used while the unmanned aerial vehicle is in the day mode configuration.

20. The apparatus of claim 14, wherein an onboard light source of the unmanned aerial vehicle is used to emit infrared light while the unmanned aerial vehicle is in a night mode configuration and is disabled while the unmanned aerial vehicle is in the day mode configuration.

* * * * *